July 31, 1951  K. B. CRAGG ET AL  2,562,376
LOCK NUT
Filed Sept. 24, 1949  2 Sheets-Sheet 1
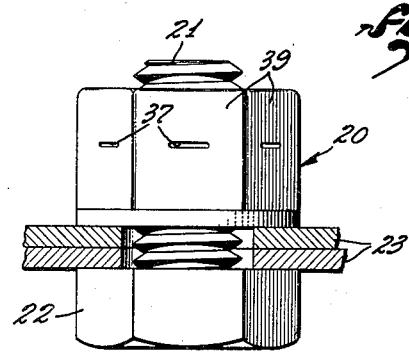
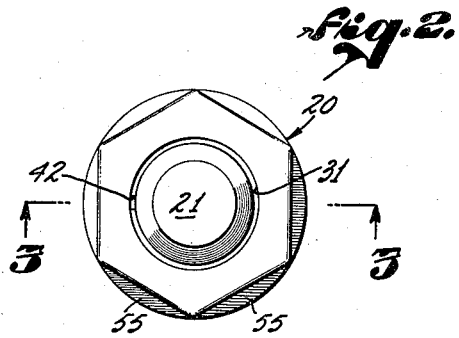
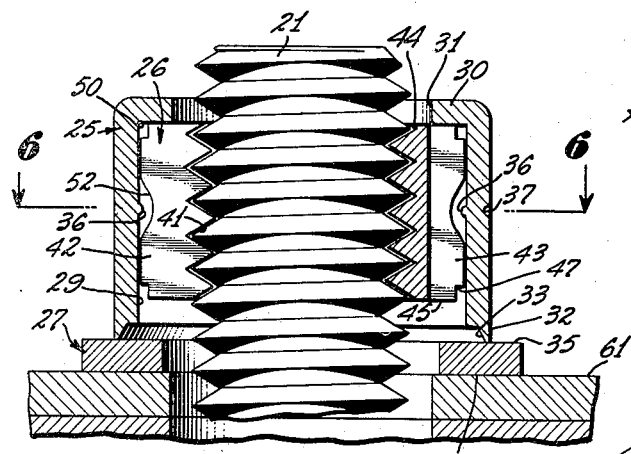
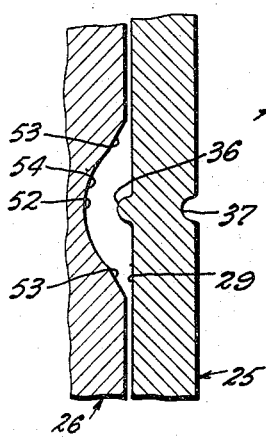
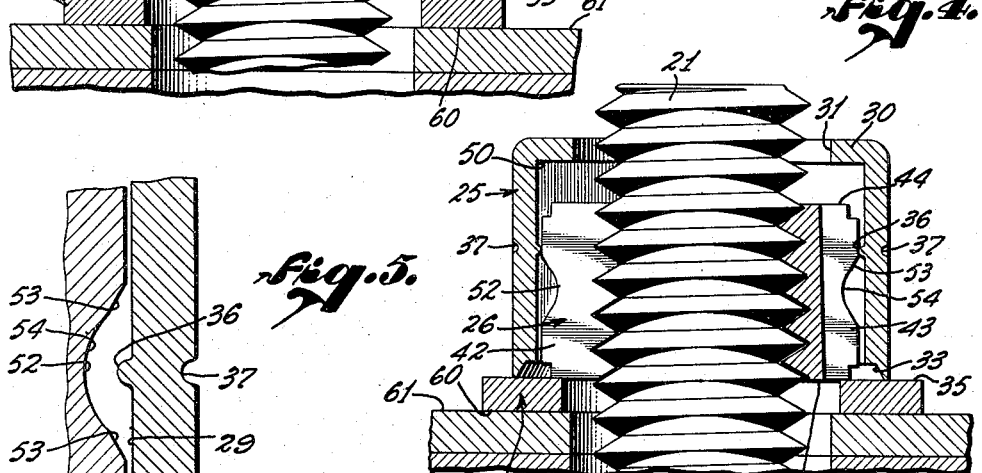
KENNETH B. CRAGG &
CARL G. THIENE,
     INVENTORS.
HUEBNER, BEEHLER, WORREL,
  HERZIG. & CALDWELL,
          ATTORNEYS.
BY
Albert M Herzig

KENNETH B. CRAGG &
CARL G. THIENE,
INVENTORS.

HUEBNER, BEEHLER, WORREL,
HERZIG & CALDWELL,
ATTORNEYS.
BY
Albert M Herzig

Patented July 31, 1951

2,562,376

UNITED STATES PATENT OFFICE 2,562,376

LOCK NUT

Kenneth B. Cragg, Glendale, and Carl G. Thiene, Pasadena, Calif., assignors to The Delron Company, Inc., Los Angeles, Calif., a corporation of Nevada Application September 24, 1949, Serial No. 117,638

14 Claims. (Cl. 151—19)

This invention relates to self-locking devices and more particularly to a combined lock nut, i. e., one in which the mechanism resisting rotation is actuated by maintained contact with the assembly surface, and stop nut, i. e., one in which the resistance to rotation is static and effective while the nut is spaced from the assembly surface.

Heretofore a self-locking nut or similar device has been subject to several objections, one of which is its high cost of manufacture. Another objection has been its lack of versatility in application or optional adjustment to differing uses, as, for example, its inapplicability where a stop-type nut is required, if such device were of a primary locking character, and vice versa. Locking devices having primary stop nut characteristics, if embodying relatively small operating angles of taper, in their clamping action upon a male threaded member, tend to generate excessive radial forces which distort or rupture the shell or gall the threads. If provided with greater angles of taper, a residue of the clamping force of the nut tends to assist, undesirably, the axially directed tensional forces tending to loosen the nut—a tendency which is accelerated when the nut leaves the assembly surface.

In sum, prior art lock-type nuts which depend for continued clamping effectiveness upon strong axial abutment against the assembly surface, once loosened from such surface, offer no safety factor against complete removal of the nut from the male service member over and above that which would be provided by an ordinary non-locking nut. Stop-type nuts are subject to excessive and deforming internal stresses and do not freely run off when that is desired.

Moreover, it has been necessary heretofore, in a locking device of the desired character hereinafter described, to place a separate washer or plate, whether of a flat or contoured type, adjacent the assembly surface prior to applying the nut. In the instant invention this added part has been eliminated as a separate entity and is made integral with the nut while forming an essential and highly desired operative portion thereof.

In addition to its functional characteristics, however, the washer, or the like, integral with the device, permits the same to be applied to the work surface and tightened thereagainst in only one direction, thereby avoiding the heretofore serious problem, particularly with inexperienced hands, arising when caused by installation of a lock nut device upside down, so that the effective locking quality thereof is lost.

Another serious problem in locking device construction, the tendency of the shell to become deformed by its necessary forcible containment of the constricting core, is overcome by the instant construction wherein the desired resilience of the shell is utilized in the locking action. The construction of said shell for this last-named purpose permits continued re-use and, in addition, lends itself to remarkably efficient mass production methods. A beauty, styling, and finished appearance, not heretofore ossociated with locking devices of this character, are simultaneously achieved.

In furthering the objects of foolproof construction in the light of simplicity and economy of manufacture, the constrictable core has been made reversible.

In view of the above considerations, among others, it is among the general objects of this invention to provide a locking device of improved function and appearance, which is versatile in use, the operative parts of which are reversible within desired limits, which is adapted for the accommodation of male threaded members of relatively high manufacturer's tolerance, whose tendency to deformity under radial load is eliminated, and which combines the desired ability to achieve and withstand high axial loads, characteristic of a lock nut, with the normally continued resistance to rotation when the nut is away from the assembly surface, characteristic of a stop nut.

It is also among the general objects of this invention to provide a locking device, which is selectively manipulatable following withdrawal thereof from engagement with an assembly surface, to render the same free-running.

Adverting to the more specific objects of the invention, an improved manufacturing technique, prevention of galling action in engagement of the nut with the assembly surface and similar non-galling constricting engagement of the core with the male threaded member, an improved locking action, an improved reversible core construction, an improved core-constricting and shell mechanism, and a finished, preferably combined, nut and washer or plate construction, are mentioned.

With these and other objects in view, the invention consists in the construction, arrangement and combination of the various parts of the device whereby the objects contemplated are attained, as hereinafter set forth, pointed out in the appended claims, and illustrated in the accompanying drawings.

In the drawings:

Figure 1 is a side view of an improved nut embodying this invention as used.

Figure 2 is a top view thereof.

Figure 3 is a vertical sectional view taken as on a line 3—3 of Figure 2, enlarged, the bolt head being cut away.

Figure 4 is a view similar to Figure 3 with the parts in a different operative position in which, as opposed to Figure 3, the core of the nut is in constricted engagement with the bolt.

Figure 5 is an enlarged view of a portion of the core-constricting mechanism, the position of the parts being the same as in Figure 3.

Figure 6:
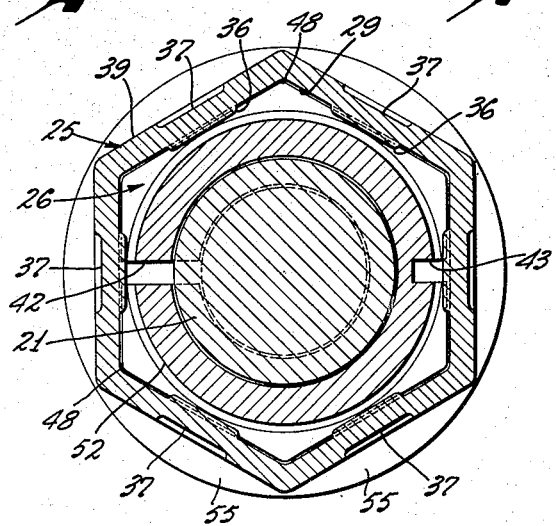
Figure 6 is a plan sectional view taken as on a line 6—6 of Figure 3.
Figure 7:
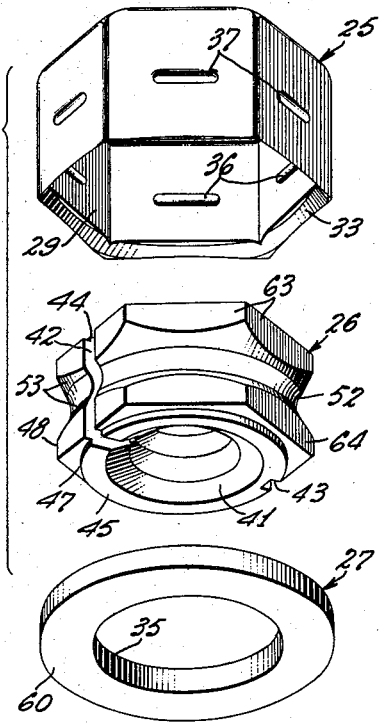
Figure 7 is an exploded view of the nut, with integral washer, of the preceding figures.

Referring more particularly to the drawings, a nut exemplifying this invention, designated generally by the numeral 20, is threaded, as used, upon the shank 21 of a bolt 22 as for clamping a pair of plates 23.

The nut 20 comprises an outer shell 25, an inner constricting core 26, and a washer 27.

The shell 25 is a formed, drawn, or stamped metal cup having substantially uniform wall thickness throughout its body portion. It is preferably hexagonal, though it may be of any other desired polygonal shape in cross-sectional view, defining a hexagonal interior chamber 29 and an inturned upper end 30 formed with a central bolt-receiving bore 31. The lower end 32 of the shell is preferably formed with an internally chamfered lip 33 making a relatively narrow contact with the upper surface 35 of the washer 27, whereby the washer may be welded or otherwise secured to the shell to make a unitary structure, as will be noted.

Inwardly directed shoulders 37, in the form of protrusions 36, preferably dimple-formed by means of a dimpling operation, are preferably horizontally positioned approximately midway between the top and bottom of the shell and effectively in the center of any or all of the hexagonal-formed flats 39. More accurately, the shoulders are spaced above the center of the shell a distance equal to the axial clearance between the shell and core.

The core 26 is hexagonal in external shape and is adapted to nest slidably for axial movement in the chamber 29 comprising the interior of the shell. The core is further formed with an axially threaded bore 41 to match the threads of the bolt.

A slot 42 extends entirely through one wall of the core longitudinally thereof to permit constriction of the core, and another slot 43, for example, may be formed diametrically opposite the slot 42 in parallel relationship from the top 44 to the bottom 45 of the core, but preferably only partially through the wall thereof, to facilitate and equalize its constriction.

The edges of the core are relieved as at 47, optionally only at the corners 48 of the hexagonal outer surface thereof but preferably circumferentially of the core, to provide a clearance for the corners 50 at the top of the shell so as to insure maximum upward movement of the core within the shell in order that the upper end 44 of the core will seat against the inturned upper end 30 of the shell. Similar relieved corners 47 at the bottom of the core provide corresponding clearance to assure firm seating of the bottom 45 of the core against the top surface 35 of the washer 27. Such clearance 47 will accommodate any flash, slag, weld, etc., occasioned by the securement of the shell to the washer.

Midway between the top and bottom of the core an annular groove 52 is formed, and the parts are so proportioned that such groove accommodates the dimple-formed shoulders 36 when the core is in its uppermost position within the shell. The sides 53 of the groove may be flat (cf. Figure 5) relative to the curved central bottom portion 54 of the groove 52. The core, including the groove 52, is symmetrical as between upper and lower halves, so that it may be inserted in the shell with either end 44 or 45 uppermost. Such reversibility permits either of the sides 53 of the groove to function as a cam when forced downwardly in the core by relative rotation of the bolt 22 to constrict the core by means of the shoulder 36. By way of example, an angular relationship of the sides 53 of the groove to the axis of the nut, of approximately 30 degrees, has been found to provide a satisfactory camming action. Other angles are a matter of choice.

The washer 27 is preferably secured to the shell by projection welding, by resistance welding, or by other suitable means. Resistance welding is facilitated when the bottom of the shell is internally chamfered at 33, as heretofore mentioned, thereby providing only a narrow annular body of metal engaging the upper surface 35 of the washer 27. A clearance is thereby also provided for the resultant weld so as to avoid interference with the movement of the core.

The washer 27 may be of a diameter corresponding to the maximum diameter of the shell as between opposite corners 48, thereby providing segmental arcuate-shaped lands 55 adjacent each flat face 39 of the shell, or such washer may be of a larger diameter than the shell providing a continuous land area completely therearound.

Figure 8:
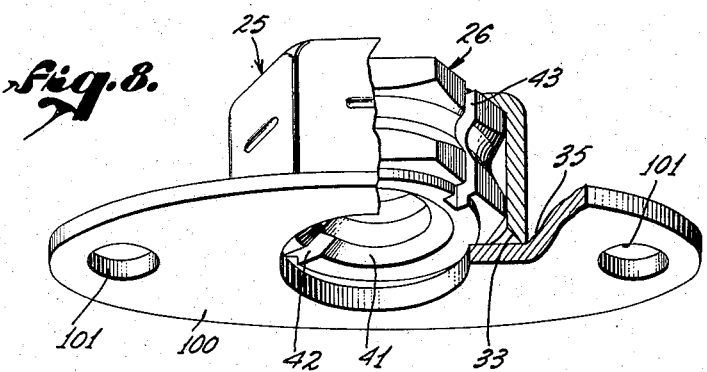
Figure 8 is a modified form of the invention comprising an integral plate and nut combination in lieu of the integral washer and nut combination of the preceding figures.

As illustrated in Figure 8, wherein the shell and core 25 and 26, respectively, may be in all respects similar to the embodiment of Figures 1 through 7, in place of an annular washer 27, a plate 100 of elliptical or any other desired horizontal shape or vertical contour, may be welded to the shell to suit a proposed work surface.

The plate may be used in addition to, but is preferably in place of, such washer 27. The plate 100 may be provided with separate rivet or bolt holes 101 by means of which the unitary device of Figure 8 may be initially secured to the outer side of an assembly surface forming an integral part thereof, in a manner well known to those skilled in the art, particularly of aircraft construction.

OPERATION

Normally, when not in use, or when the parts of the nut are in the position illustrated, for example, in Figure 3, the relative position of the core and shell is such that the shoulders 36 are accommodated within the annular groove 52 of the core. The core is then in its uppermost position of retraction within the shell and is removed from the upper inner surface 35 of the washer. In this condition of the parts, the outer hexagonal surface of the core is in preferred slidable engagement with the corresponding internal wall of the shell. The relationship of these adjacent walls is such that relative rotation of the core within the shell is prevented, and the proportioning of the parts is such that even when the core is constricted within the shell to a maximum extent, the core and shell remain keyed to render relative rotation of these parts impossible.

When the shank 21 of the bolt is initially threaded through the nut and core, no drag due to the locking mechanism is encountered, but the nut is then free-running, as may be seen in Figure 3. Thereafter, the nut, i. e., the lower surface 60 of the washer portion thereof, abuts the assembly surface 61, and further rotation of the bolt and nut relative to one another draws the core 26 downwardly within the shell constricting the core by the camming action of the groove and the inwardly directed shoulders 36.

The shoulders 36 ultimately engage against the upper segmental flats 63 at the upper end of the core and constrict the core more at the top than at the bottom (see Figure 4). The topmost threads of the core are thereby more firmly engaged with the bolt than are the lowermost threads so that a desired wedging action is occasioned that has been proven to hold the core in a locked condition wherein no relative unthreading or loosening movement of the nut develops in spite of severe vibration testing.

Experiments have shown that when the shoulders 36 are spaced downwardly on the core and caused to engage the lowermost segmental flats 64 of the core, so as to constrict the lower end of the core to a greater extent than the upper end, the reversed wedging thus occasioned is materially less effective, and vibration tends relatively easily both to unthread the nut from its axial engagement against the assembly surface and to completely unthread the nut from the bolt.

The washer 27 provides a firm foundation against a substantial portion of the bottom 45 of the core, forcibly engaging the same when the nut is tightened against the work surface.

Inasmuch as the shoulders 36 are formed preferably circumferentially of the shell, and particularly at or about the center, circumferentially speaking, of each of the hex-formed flats 39, the shell has a tendency to bow outwardly, thereby holding the core in its contracted condition in a yieldable and resilient manner. This resilient bowing or bulging of the shell is so proportioned in relationship to the size of the shoulders 36 and other mechanism tending to constrict the core, that no permanent strain upon the shell is occasioned, and when the core-constricting tension is released, the hexagonal flats then resume their original unbowed shape. Obviously, such a nut is thus capable of an indefinite number of removals and re-uses.

In the removal of the instant nuts, the same may be backed off the work surface slightly, then the shell may be struck or pressed axially in the direction of the work surface, thereby at once releasing the otherwise continued stop-action of the nut, restoring the core to its unconstricted condition, and permitting the nut to be readily removed from the bolt as a free-running unit.

Unless the lock is forcibly and intentionally broken, as aforesaid, upon removal of the nut from the assembly surface, the relative position of the core and shell remains the same. That is, the core remains closed around the stud or bolt, inducing a static or drag torque (referred to above as a "stop-nut" action) of such order that under vibration the nut would not rotationally change its position on the stud or bolt unless manually moved. This action is of particular benefit where the failure of the structure destroys the surface mating with the nut surface, or otherwise where the nut has been loosened slightly from the work surface to break the "lock-nut" action.

On the installation of the nut, as the washer comes in contact with the work surface, an increase in wrench torque is noted. The first increase is due to the movement of the core in the shell and results in the closure of the core.

The magnitude of this initial torque increase is shown in the following life test intended also to demonstrate the ability of the construction in question to withstand numerous installations, tightenings, and removals of the nut. The test was based upon a $\frac{5}{16}$–24 nut of all stainless steel construction:

The specimens were installed on bolts and torqued on a steel mandril to a tightening torque of 100 inch pounds. The nuts were removed free of the assembly surface, and the static torque readings were made as the specimen was turned off the bolt five turns and then turned on five turns.

| Cycle | Nut No. 1 | Nut No. 2 | Nut No. 3 |
|---|---|---|---|
| 1 | 14.5 | 18 | 21.5 |
| 2 | 13.5 | 17.5 | 17.5 |
| 3 | 13.5 | 17.5 | 17 |
| 4 | 13 | 17.5 | 16.5 |
| 5 | 13 | 17.5 | 15.5 |
| 6 | 13 | 18 | 15 |
| 7 | 13 | 18 | 15.5 |
| 8 | 13 | 18 | 15 |
| 9 | 13.5 | 18 | 15.5 |
| 10 | 13.5 | 18.5 | 15.5 |
| 11 | 14 | 19.5 | 15.5 |
| 12 | 14 | 19 | 15.5 |
| 13 | 14.5 | 18 | 15.5 |
| 14 | 15 | 18 | 15.5 |
| 15 | 15 | 17.5 | 15.5 |
| Setting Torque | 40 | 50 | 50 |

The above figures are the average for each cycle.

The values indicated in the first table, above, as well as in the last two tables hereinafter are in inch-pounds.

The following test results also indicate the performance characteristics of the instant construction, all of them being based upon the $\frac{5}{16}$–24 all stainless steel nuts:

*Axial tensile strength*

[Specimens pulled to destruction]

Specimen Number:                      Pounds
 1 _____ 9280
 2 _____ 9140
 3 _____ 9950
 4 _____ 9120

The static torque was measured at 7390 pounds and in all cases was in excess of three inch pounds.

*Heat vibration test*

Nuts were installed at 170 inch pounds and removed from the assembly surface three turns. Specimens were vibrated on a variable amplitude machine at a temperature of 800° Fahrenheit for a period of 180 minutes.

| Nut No. | Before Vibration, Static Torque | After Vibration Breakaway Torque | After Vibration Static Torque |
|---|---|---|---|
| 1 | 16 | 40 | 28 |
| 2 | 14 | 40 | 28 |
| 3 | 9 | 20 | 14 |
| 4 | 10 | 25 | 14 |
| 5 | 14 | 40 | 26 |
| 6 | 9 | 15 | 11 |
| 7 | 13 | 30 | 26 |
| 8 | 9 | 20 | 14 |
| 9 | 8 | 15 | 11 |
| 10 | 15 | 40 | 21 |

Jack hammer vibration test

Nuts were installed on the mandril at 170 inch pounds and removed from the assembly surface three full turns. Specimens were vibrated for a period of 90 minutes in increments of ten minutes' vibration with a rest period of five minutes.

| Nut No. | Before Vibration, Static Torque | After Vibration, Static Torque |
|---|---|---|
| 1 | 12 | 12 |
| 2 | 20 | 15 |
| 3 | 25 | 20 |
| 4 | 13 | 18 |
| 5 | 16 | 18 |
| 6 | 17 | 25 |
| 7 | 12 | 20 |
| 8 | 9 | 13 |

The improved construction herein described can be fabricated from a wide variety of materials. At the present time the nut is to be constructed in three forms: (1) shell and washer—type 321 stainless steel, core—type 416 stainless steel; (2) shell and washer—ferrous or common steel, core—type 416 stainless steel; (3) all common steel, cadmium plated. The stainless steel cores are to be silver plated to form a metallic lubricated surface to reduce the possibility of galling.

In the manufacture of the instant lock nut, the following process is followed: A disc is first blanked out from flat sheet metal stock. The disc is then drawn as by a punch-press operation to form a cup. The cup is either formed initially into a roughly hexagonal configuration or into a finished hexagonal configuration by means of a die. Another die is then used to pierce the opening 31 from the top of the shell after which the core is inserted in the shell. The protrusions are then formed in the shell and the bottom of the shell trimmed off as by means of a spot surfacer, after which the ring or washer 27 is welded thereto as by resistance welding.

The core is separately formed, as on an automatic screw machine, from selected hexagonal bar stock which is slotted longitudinally throughout its length. The bar or cores are heat-threaded and, if not previously done, drilled, formed, grooved, threaded, and plated, as required, with a surfacing, non-galling and/or lubricating metal, and then installed in the shell as heretofore noted. The core for assembly is reversible in the shell, i. e., either end will serve as the top or bottom.

The dimensional requirements of component parts can obviously be altered from that below set forth to emphasize divergent desired operative characteristics of the nut.

As illustrative of the dimensions of a nut of $\frac{7}{16}''$, 24 thread-type, the washer 27 may be .040'' in thickness, .570'' in outside diameter, and have a .325'' bore.

The shell may have an overall diameter of $\frac{1}{2}''$ from flat face to opposite flat face, a wall thickness of .030'' and an opening 31 at the top thereof of .325''. The shell may be .325'' in height from the upper washer surface 35 to the top of the shell and the dimples may be .010'' in height and .1'' in horizontal length. The dimple may protrude into the shell a distance of .008''.

The core may have an overall diameter from flat face to opposite flat face of $\frac{7}{16}''$, a groove .017'' in depth, and a slot 26 .03'' in width. The relieved portions of the core at the opposite ends thereof may give the core a diameter of .25'' at its ends and said relief 47 may be .015'' in height. The core itself may be .225'' in height.

The annular groove 52 may be formed on any appropriate radius for a distance longitudinally of the core of .045'', merging with slanted sides 53 making 30-degree angles relative to the longitudinal axis of the core. The overall width of the annular groove may be .08''.

The above dimensions, as indicated, have proven satisfactory in the construction of a practical lock nut conforming to the general disclosure hereof. The dimensions are not intended as exclusive nor necessarily critical, as will readily appear to those skilled in the art of lock nut production.

Another feature of importance readily incorporated into the instant construction to achieve a much desired result particularly in high temperature work, as in aircraft and the like, will now be mentioned. By the omission of the opening 31 in the top of the shell the latter may be constituted a sealed chamber open only at the bottom to permit insertion of the end of the bolt or stud. If the latter is made short enough that it does not extend axially beyond the effective interior axial dimension of the shell the nut may be tightened over the end of the bolt effectively sealing the latter against injurious oxidation and corrosion by corroding gases, liquids, fumes, etc., particularly prevalent in some conditions of marine and high temperature operation.

The projecting end 21 of a bolt is particularly subject, by virtue of the exposed threads, to corrosion, rendering removal of the nut difficult if not impossible and galling the threads of the same even where removal is possible. The oxidation begun in the threads projecting from the nut readily travels over the surface of the bolt and extends into the region of mutual engagement of the threads of the bolt with those of the nut thereby freezing or rusting the one to the other.

The closed top left on the nut can be extended axially to lengthen the effective capacity of the nut to receive a bolt of standard aircraft specification in relation to the height of the nut.

Normally, in the instant construction, a space above the upper end 44 of the coil and the corresponding end of the shell is formed when the coil moves downwardly in the shell for securement in place. This space in any event accommodates one or more projecting threads of the bolt beyond those confined within the core.

The upper end of the shell may thus be formed in the manner of an acorn nut or an extended dome may be formed only in the area above illustrated and described coincident with the opening 31 and of a diameter less than that of the core but sufficient to accommodate the bolt itself. Top shoulders will thereby be retained to limit upward axial movement of the core within the shell as heretofore described.

This invention features the provision of a locking device having an improved drawn shell construction of springy or resilient characteristics, associated with a preferably reversible resilient constricting core and an integral washer or plate comprising a portion of the unitary locking device. It also features the provision of an improved locking and stopping construction of improved structural and operating qualities which is free-running on a bolt to the assembly surface, and which may be intentionally rendered free running during removal thereof from a bolt. In featuring the above qualities and characteristics, versatility of use, and economy of manufacture for such diversified use, are likewise significant.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what we claim as new and desire to secure by Letters Patent is:

1. A lock nut comprising an internally axially threaded radially constrictable non-circular core, a similarly shaped non-circular outer sheet metal shell surrounding said core and having a substantially flat resilient side wall, interengaging cams on said shell side wall and core, respectively, the cam on said shell being spaced upwardly from the bottom of the shell to retain the core normally yieldably within an upper portion of the shell, while permitting limited downward axial movement thereof, and said cam on said shell being located and spaced entirely inwardly from the periphery of said side wall whereby relative downward axial movement of said core within said shell will apply a yieldable radial force to said core through said cams.

2. A lock nut as defined in claim 1 wherein said cam on said shell comprises an inwardly extending indented portion of said side wall.

3. A lock nut as defined in claim 1 wherein said shell and core are of complementary polygonal shape in radial section.

4. A lock nut as defined in claim 1 wherein said shell is of sheet metal and wherein said cam on said shell comprises an inwardly extending indented portion of said side wall, and wherein said core is provided with a recess arranged to receive said indentation and one wall of which constitutes the cam on said core.

5. A lock nut as defined in claim 1 wherein said core is provided with an axially extending surface adjacent the cam thereon and at the radially outer edge thereof whereby the cam on said side wall is adapted to constrict said core, as described, and then engage said axially extending surface to maintain a limited predetermined radial pressure on said core.

6. A self-locking nut comprising an outer shell of hexagonal shape, the interior of said shell defining a hexagonal chamber extending from the top of said shell to the bottom thereof, inwardly directed constricting shoulder means comprising dimples in the centers of the flat surfaces of the hexagonal interior of the shell between the hex-formed corners of said shell, said shoulder means being positioned approximately halfway between the top and bottom of the shell, a constrictable core disposed within the shell for longitudinal sliding movement therein, complementary means upon the exterior of the core comprising a hexagonal exterior surface normally parallel to and slidably engageable axially with the inner walls of said shell and further comprising groove means disposed circumferentially of said core formed therein approximately midway between the top and bottom ends of the core, said core being formed with a threaded bore axially thereof adapted to receive a correspondingly threaded male member, said core being formed with a longitudinal slot throughout one side thereof, said groove means being adapted in one slidable longitudinal position of the core relative to the shell to accommodate said inwardly directed shoulder means formed in the shell, said annular groove being formed with a tapered side adapted to engage said shoulder means upon forced downward axial movement of the core within the shell whereby to constrict said core, washer means firmly united with the shell at the bottom thereof in coaxial relationship therewith and forming a retainer and abutment for the bottom of the core at the lowermost position thereof within the shell, and means at the top of the shell directed radially inwardly for retaining the core within the shell, said last-named means comprising an annular shoulder defining a continuous curve with the side walls of the shell.

7. A self-locking nut comprising a radially yieldable outer shell of hexagonal, cross-sectional shape having resilient sidewalls of substantially uniform thickness, the interior of said shell defining a hexagonal chamber extending from the top of said shell to the bottom thereof, inwardly directed constricting shoulder means comprising dimples formed within the interior of said chamber circumferentially thereof in the centers of the flat surfaces of the hexagonal interior of the shell between the hex-formed corners of said shell and being elongate circumferentially of the shell, a constrictable core disposed within the shell for longitudinal sliding movement therein, complementary means upon the exterior of the core comprising a hexagonal exterior surface comprising flat surfaces slidably engageable axially with the inner walls of said shell and further comprising groove means disposed circumferentially of said core formed therein approximately midway between the top and bottom ends of the core, said core being formed with a threaded bore axially thereof adapted to receive a correspondingly threaded male member, said core being formed with a longitudinal slot throughout one side thereof, said groove means being adapted in one slidable longitudinal position of the core relative to the shell to accommodate said inwardly directed shoulder means formed in the shell, said annular groove being formed with a tapered side adapted to engage said shoulder means upon forced downward axial movement of the core within the shell whereby to constrict said core, washer means firmly united with the shell at the bottom thereof in co-axial relationship therewith and forming a retainer and abutment for the bottom of the core at the lowermost position thereof within the shell, and means at the top of the shell directed radially inwardly for retaining the core within the shell, said last-named means comprising an annular shoulder defining a continuous curve with the side walls of the flat shell, the external side walls of the core being adapted to engage said inwardly directed shoulder at an extreme of downward movement of the core within the shell to effect and maintain a yieldable maximum constriction of said core.

8. A self-locking nut comprising a radially yieldable outer shell of hexagonal, cross-sectional shape having resilient sidewalls of substantially uniform thickness, the interior of said shell defining a hexagonal chamber extending from the top of said shell to the bottom thereof, inwardly directed constricting shoulder means comprising dimples formed within the interior of said chamber circumferentially thereof in the flat surfaces of the hexagonal interior of the shell between the hex-formed corners of said shell, said shoulder means being positioned over halfway from the bottom to the top of the shell, a constrictable core disposed within the shell for longitudinal sliding movement therein, complementary means upon the exterior of the core comprising a hexagonal exterior surface slidably engageable axially with the inner walls of said shell and further comprising groove means disposed circumferentially of said core formed therein approximately midway between the top and bottom ends of the core, said core being formed with a threaded bore axially thereof adapted to receive a correspondingly threaded male member, said core being formed with a longitudinal slot throughout one side thereof, said groove means being adapted in one slidable longitudinal position of the core relative to the shell to accommodate said inwardly directed shoulder means formed in the shell, said annular groove being formed with at least one tapered side adapted to engage said shoulder means upon forced downward axial movement of the core within the shell whereby to constrict said core, washer means firmly united with the shell at the bottom thereof in co-axial relationship therewith and forming a retainer and abutment for the bottom of the core at the lowermost position thereof within the shell, and means at the top of the shell directed radially inwardly for retaining the core within the shell, said last-named means comprising an annular shoulder defining a continuous curve with the side walls of the shell, the external side walls of the core being adapted to engage said inwardly directed shoulder at an extreme of downward movement of the core within the shell to effect and maintain a yieldable maximum constriction of said core, the interior and exterior cross-sectional measurements of said shell and hexagonal surface of the core being substantially uniform from the top to the bottom thereof, said washer means having an axial bore adapted to readily accommodate said threaded male member, and said axial bore being of lesser diameter than the interior of said shell, and comprising abutment means for engagement of the bottom of said core in said extreme of downward movement of the core within the shell, said washer means having a greater overall diameter than said shell between opposite flat sides of said shell.

9. A self-locking nut comprising a radially yieldable outer shell of hexagonal, cross-sectional shape having resilient sidewalls of substantially uniform thickness, the interior of said shell defining a hexagonal chamber extending from the top of said shell to the bottom thereof, inwardly directed constricting shoulder means formed within the interior of said chamber circumferentially thereof in the centers of the flat surfaces of the hexagonal interior of the shell between the hex-formed corners of said shell and being elongate circumferentially of the shell, said shoulder means being positioned over halfway from the bottom to the top of the shell, a constrictable core disposed within the shell for longitudinal sliding movement therein, complementary means upon the exterior of the core comprising a hexagonal exterior surface slidably engageable axially with the inner walls of said shell and further comprising groove means disposed circumferentially of said core formed therein approximately midway between the top and bottom ends of the core, said core being formed with a threaded bore axially thereof adapted to receive a correspondingly threaded male member, said core being formed with a longitudinal slot throughout one side thereof, said groove means being adapted in one slidable longitudinal position of the core relative to the shell to accommodate said inwardly directed shoulder means formed in the shell, said annular groove being formed with tapered sides adapted to engage said shoulder means upon forced downward axial movement of the core within the shell whereby to constrict said core, washer means firmly united with the shell at the bottom thereof in co-axial relationship therewith and forming a retainer and abutment for the bottom of the core at the lowermost position thereof within the shell, and means at the top of the shell directed radially inwardly for retaining the core within the shell, said last-named means comprising an annular shoulder defining a continuous curve with the side walls of the shell, the external side walls of the core being adapted to engage said inwardly directed shoulder at an extreme of downward movement of the core within the shell to effect and maintain a yieldable maximum constriction of said core solely at the top thereof, said core being symmetrical from the center to the ends and being reversible within the shell.

10. A self-locking nut comprising an outer shell of hexagonal shape, the interior of said shell defining a hexagonal chamber extending from the top of said shell to the bottom thereof, inwardly directed constricting shoulder means comprising dimples in the centers of the flat surfaces of the hexagonal interior of the shell between the hex-formed corners of said shell, said shoulder means being positioned approximately halfway between the top and bottom of the shell, a constrictable core disposed within the shell for longitudinal sliding movement therein, complementary means upon the exterior of the core comprising a hexagonal exterior surface slidably engageable axially with the inner walls of said shell and further comprising groove means disposed circumferentially of said core formed therein approximately midway between the top and bottom ends of the core, said core being formed with a threaded bore axially thereof adapted to receive a correspondingly threaded male member, said core being formed with a longitudinal slot throughout one side thereof, said groove means being adapted in one slidable longitudinal position of the core relative to the shell to accommodate said inwardly directed shoulder means formed in the shell, said annular groove being formed with tapered sides adapted to engage said shoulder means upon forced downward axial movement of the core within the shell whereby to constrict said core, washer means firmly united with the shell at the bottom thereof in coaxial relationship therewith and forming a retainer and abutment for the bottom of the core at the lowermost position thereof within the shell, and means at the top of the shell directed radially inwardly for retaining the core within the shell, said last-named means comprising an annular shoulder defining a continuous curve with the side walls of the shell, said shell, adjacent the washer means, and said core having the edges thereof relieved to provide clearance at the upper and lower corners of the shell.

11. The combination of a hexagonal, radially resilient and yieldable shell of uniform sidewall thickness, a restrictable hexagonal core non-rotatably and axial slidable within the shell, and a washer member firmly and co-axially secured to the shell at the bottom thereof, and cooperable complementary means between the shell and the core adapted for constriction of the core due to selective longitudinal movement of the core within the shell, said means comprising said shell wall being deformed at a central station inwardly and said core being formed with a recess complementary to said shell wall at said central station.

12. An all-metal lock nut comprising a shell having the shape substantially of an inverted cup of uniform wall thickness and hexagonal shape, side wall portions of the cup being yieldable outwardly, a hexagonal core adapted to nest within the cup in slidable longitudinal relationship therewith, a washer closing the mouth of the cup, extending laterally outwardly beyond the walls therewith and designed to engage forceably against a work surface, the washer being formed with a bolt-receiving opening, said core having an axial threaded bore in alignment with said opening and being longitudinally slotted to render the core constrictable, the core and the shell having complementary abutment means on their adjacent side surfaces engageable in a position of relative axial movement of the core within the shell to constrict the core therein, said shell portions being bowed outwardly under the operative forces tending to constrict the core, said complementary abutment means comprising an inwardly directed dimple formed in the shell and a groove formed in the core, said dimple being non-constrictably engageable in the groove in said position of axial movement of the core within the shell and being constrictably engageable with a wall of the core adjacent the groove in another position of such axial movement wherein the core is in abutting relation with said washer.

13. An all-metal lock nut comprising a shell having the shape substantially of an inverted cup of uniform wall thickness and hexagonal shape, side wall portions of the cup being yieldable outwardly, a hexagonal core adapted to nest within the cup in slidable longitudinal relationship therewith, a washer closing the mouth of the cup, extending laterally outwardly beyond the walls therewith and designed to engage forceably against a work surface, the washer being formed with a bolt-receiving opening, said core having an axial threaded bore in alignment with said opening and being longitudinally slotted to render the core constrictable, the core and the shell having complementary abutment means on their adjacent side surfaces engageable in a position of relative axial movement of the core within the shell to constrict the core therein, said shell portions being bowed outwardly under the operative forces tending to constrict the core, the inverted bottom of the cup being formed without a bolt-receiving opening and being imperforate.

14. The combination of a hexagonal, radially resilient and yieldable shell of uniform sidewall thickness, a restrictable hexagonal core non-rotatably and axially slidable within the shell, and a washer member firmly and co-axially secured to the shell at the bottom thereof, and cooperable complementary means between the shell and the core adapted for constriction of the core due to selective longitudinal movement of the core within the shell, said means comprising said shell wall being deformed at a central station inwardly and said core being formed with a recess complementary to said shell wall at said central station, said last means, during the locking movement of the core within the shell engaging the top portion of the core and constricting the top portion of said core relative to the bottom portion thereof, to achieve an angular relationship between the adjacent walls of the core and shell for resisting relative unlocking movement of the core shell.

KENNETH B. CRAGG.
CARL G. THIENE.

REFERENCES CITED

The following references are of record in the file of this patent:

UNITED STATES PATENTS

| Number | Name | Date |
| --- | --- | --- |
| 786,725 | Bryce | Apr. 4, 1905 |
| 1,025,702 | Larrad | May 7, 1912 |
| 1,494,817 | Seward | May 20, 1924 |
| 2,079,746 | Morgan | May 11, 1937 |
| 2,391,989 | Luce | Jan. 1, 1946 |
| 2,410,730 | Gwyn | Nov. 5, 1946 |
| 2,421,201 | Hallock | May 27, 1947 |
| 2,438,077 | Summers | Mar. 16, 1948 |
| 2,451,991 | Swanstrom | Oct. 19, 1948 |

FOREIGN PATENTS

| Number | Country | Date |
| --- | --- | --- |
| 37,761 | Norway | Aug. 5, 1921 |
| 498,505 | Great Britain | Apr. 5, 1937 |
| 566,232 | Great Britain | Dec. 19, 1944 |